(12) United States Patent
Affa et al.

(10) Patent No.: US 8,448,347 B2
(45) Date of Patent: May 28, 2013

(54) LENGTH MEASURING DEVICE

(75) Inventors: Alfred Affa, Stein a.d. Traun (DE);
Johannes Haunreiter, Burghausen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 227 days.

(21) Appl. No.: 13/125,638

(22) PCT Filed: Oct. 13, 2009

(86) PCT No.: PCT/EP2009/063315
§ 371 (c)(1),
(2), (4) Date: Apr. 22, 2011

(87) PCT Pub. No.: WO2010/049265
PCT Pub. Date: May 6, 2010

(65) Prior Publication Data
US 2011/0209352 A1 Sep. 1, 2011

(30) Foreign Application Priority Data

Oct. 31, 2008 (DE) .......................... 10 2008 043 353

(51) Int. Cl.
*G01D 5/347* (2006.01)
(52) U.S. Cl.
USPC ............................................. 33/706; 33/702
(58) Field of Classification Search
USPC ................................................... 33/702–708
See application file for complete search history.

(56) References Cited

U.S. PATENT DOCUMENTS

| | | | |
|---|---|---|---|
| 4,250,381 A | 2/1981 | Yoshiike et al. | |
| 6,084,234 A | 7/2000 | Stridsberg | |
| 6,191,415 B1 | 2/2001 | Stridsberg | |
| 6,272,766 B1 * | 8/2001 | Tondorf et al. | 33/809 |
| 6,571,486 B1 * | 6/2003 | Tondorf et al. | 33/706 |
| 6,630,659 B1 | 10/2003 | Stridsberg | |
| 7,373,852 B2 | 5/2008 | Boge et al. | |
| 7,549,234 B2 * | 6/2009 | Holzapfel et al. | 33/706 |
| 7,788,821 B2 * | 9/2010 | Affa et al. | 33/706 |
| 8,001,700 B2 * | 8/2011 | Tondorf et al. | 33/706 |
| 2006/0162473 A1 | 7/2006 | Boge et al. | |
| 2009/0013552 A1 * | 1/2009 | Affa et al. | 33/706 |
| 2011/0209352 A1 * | 9/2011 | Affa et al. | 33/706 |

FOREIGN PATENT DOCUMENTS

| | | |
|---|---|---|
| DE | 29 29 989 A1 | 2/1980 |
| DE | 31 24 723 A1 | 6/1982 |
| DE | 40 17 858 A1 | 12/1991 |
| DE | 101 64 404 A1 | 12/2002 |
| DE | 10 2007 031 976 A1 | 1/2009 |
| EP | 1 862 769 A2 | 12/2007 |
| WO | WO 2004/0383383 A1 | 5/2004 |

* cited by examiner

*Primary Examiner* — Yaritza Guadalupe-McCall
(74) *Attorney, Agent, or Firm* — Brinks Hofer Gilson & Lione

(57) ABSTRACT

A length measuring device for measuring a relative position of two objects, the length measuring device including a scale in a housing and a scanning unit displaceable in a measuring direction X relative to the scale and the housing, wherein the scanning unit is disposed inside the housing and including a heat-generating electrical component. The length measuring device further including a thermal conduction path designed for transferring heat generated at the heat-generating electrical component to the housing.

11 Claims, 2 Drawing Sheets

LENGTH MEASURING DEVICE

Applicants claim, under 35 U.S.C. §§120 and 365, the benefit of priority of the filing date of Oct. 13, 2009 of a Patent Cooperation Treaty patent application, copy attached, Serial Number PCT/EP2009/063315, filed on the aforementioned date, the entire contents of which are incorporated herein by reference, wherein Patent Cooperation Treaty patent application Serial Number PCT/EP2009/063315 was not published under PCT Article 21(2) in English.

Applicants claim, under 35 U.S.C. §119, the benefit of priority of the filing date of Oct. 31, 2008 of a German patent application, copy attached, Serial Number 10 2008 043 353.5, filed on the aforementioned date, the entire contents of which is incorporated herein by reference.

BACKGROUND OF THE INVENTION

1. Field of the Invention

The present invention relates to a length measuring device.

2. Description of the Related Art

Such length measuring devices, of the kind described for instance in German Patent Disclosure DE 29 29 989 A1, serve to measure lengths as well as travel distances and are used in particular in processing machines for measuring the relative motion of a tool with respect to a workpiece to be machined, in coordinate measuring machines, and increasingly in the semiconductor industry as well.

A scale is used to measure the lengths and travel distances. The scale, is accommodated in a housing so as to be protected against environmental factors. Temperature changes inside the housing cause a change in length of the scale, depending on the material of the scale. These changes in length lead to measurement errors.

To keep such temperature changes as small as possible, it is proposed in German Patent Disclosure DE 101 64 404 A1 that the temperature of the interior of the encapsulated length measuring device be tempered in that there is a regulated flow of coolant through it.

The intent of this embodiment is to have the scale assume the temperature level of the machine tool. A disadvantage is that temperature changes that are generated by electrical components of the length measuring device itself are not taken into account.

The demands made of length measuring devices are becoming more and more stringent, and both higher resolution and greater precision and replicability of position measurement are constantly demanded. There should also be a compact mechanical construction as well as simple, malfunction-proof generation and transmission of measured values.

These demands require an encapsulated length measuring device with a scale accommodated in a protected fashion. The demand for high resolution dictates an ever smaller scanning spacing that is constant over the entire measured length. This is attained on the one hand by a relatively small scanning spacing of less than 100 μm between the scale and the scanning unit. On the other hand, high resolution is attained by guiding the scanning unit on the scale and/or on the housing in an unimpeded precise manner by having the mounting block coupled to the scanning unit via a coupling that is rigid only in the measuring direction. In all the other directions, this coupling enables a movement of the mounting block without affecting the precise guidance and movement of the scanning unit in the measuring direction.

A compact construction and malfunction-proof generation and transmission of measured values requires integrating an increasing number of electrical components in the scanning unit itself. Increasingly for this purpose, sensor chips, an array of scanning sensors, such as light-sensitive detectors if the scale is scannable photoelectrically, and signal processors, such as A/D converters, amplifiers, microprocessors, and interfaces are for example disposed in the least amount of space. The result is increased heat generation in the scanning unit, which heats the scale disproportionately because of the requisite small scanning spacing. This heating causes changes in length of the scale and measurement inaccuracies.

SUMMARY AND OBJECTS OF THE INVENTION

An object of the present invention is to create a length measuring device with high measurement precision.

This object is attained according to the present invention by a length measuring device for measuring a relative position of two objects, the length measuring device including a scale in a housing and a scanning unit displaceable in a measuring direction X relative to the scale and the housing, wherein the scanning unit is disposed inside the housing and including a heat-generating electrical component. The length measuring device further including a thermal conduction path designed for transferring heat generated at the heat-generating electrical component to the housing.

With the present invention, a compact construction of a length measuring device is made possible, and high measurement precision and replicable position measurement are also attainable.

According to the present invention, a thermal conduction path is created between a heat-generating electrical component of the scanning unit and the housing of the length measuring device.

As a result of the provision of a thermally conductive element between the heat-generating electrical component of the scanning unit, in particular the sensor chip, and the housing of the length measuring device, a thermal conduction path is created between the electrical component and the housing in order to transfer the heat generated by the electrical component to the housing. The components involved in the thermal conduction path have a low thermal resistance. Thus, with the present invention, a thermal conduction path from the sensor chip in the direction of the housing is created in a purposeful way.

The heat transferred from the thermally conductive element of the scanning unit to the housing is effected via a gap. The gap is embodied and dimensioned such that good heat transfer is guaranteed, on the one hand, and on the other hand, the freedom of motion of the scanning unit relative to the housing is unhindered.

The thermally conductive element can include a plurality of portions that are suitably optimized.

The present invention will be described in further detail with the aid of an exemplary embodiment.

DESCRIPTION OF THE PREFERRED EMBODIMENT(S) OF THE INVENTION

Figure 1:
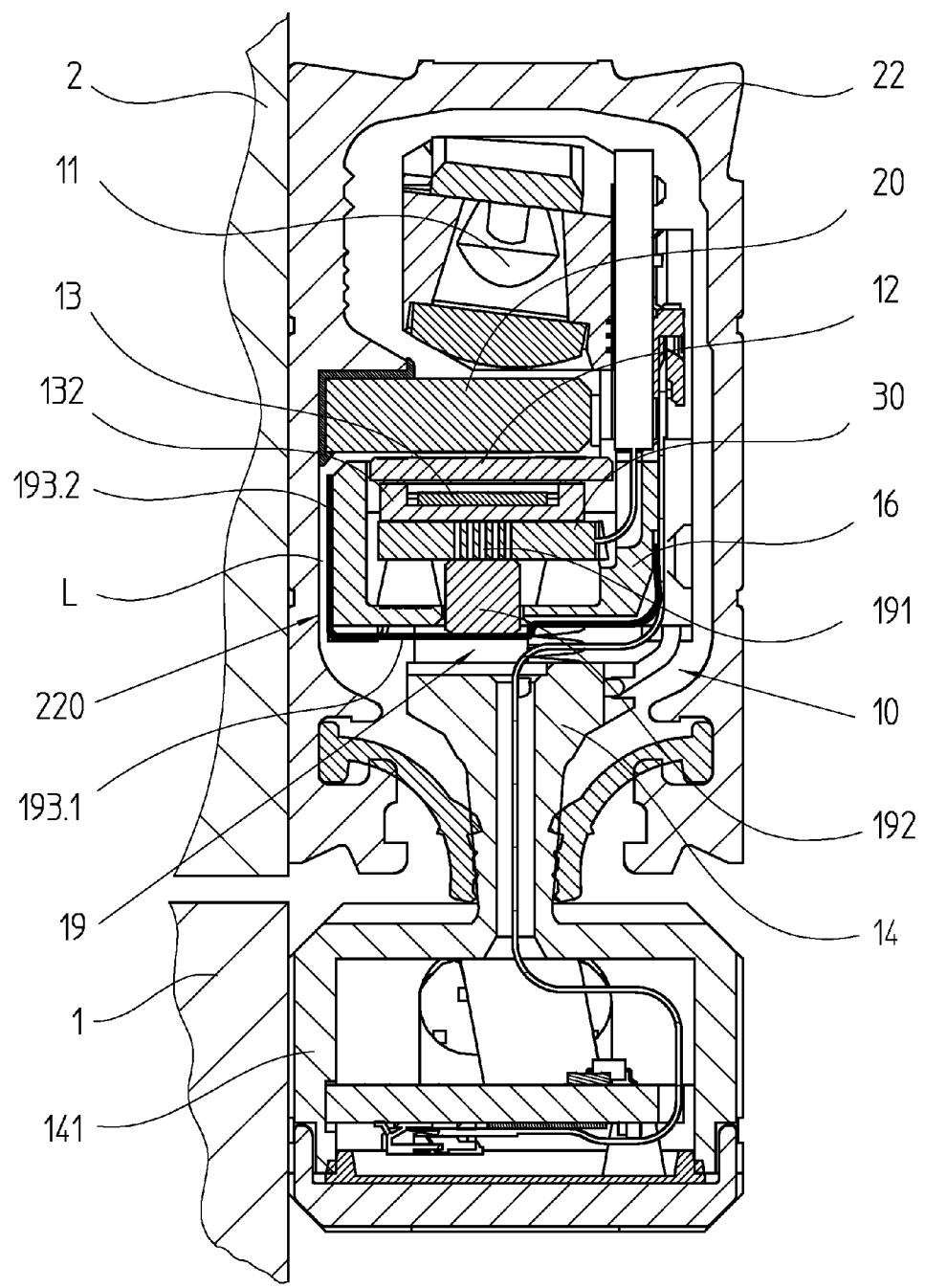
FIG. 1 shows a cross-section through an embodiment of a length measuring device in accordance with the present invention.
Figure 2:
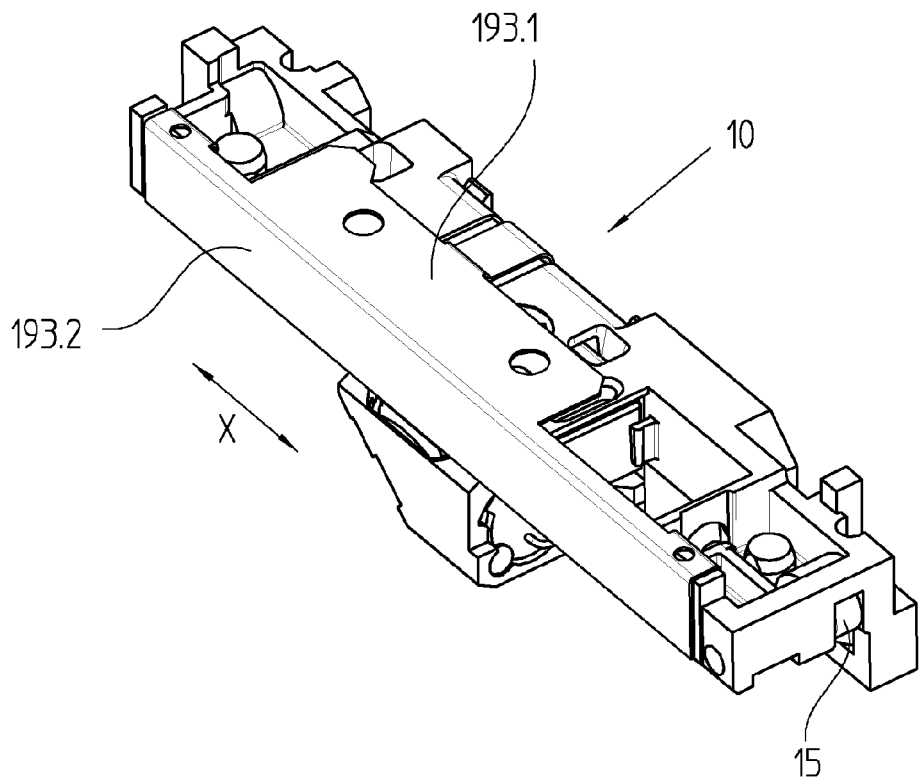
FIG. 2 shows a perspective view of an embodiment of a scanning unit of the length measuring device of FIG. 1 in accordance with the present invention.
Figure 3:
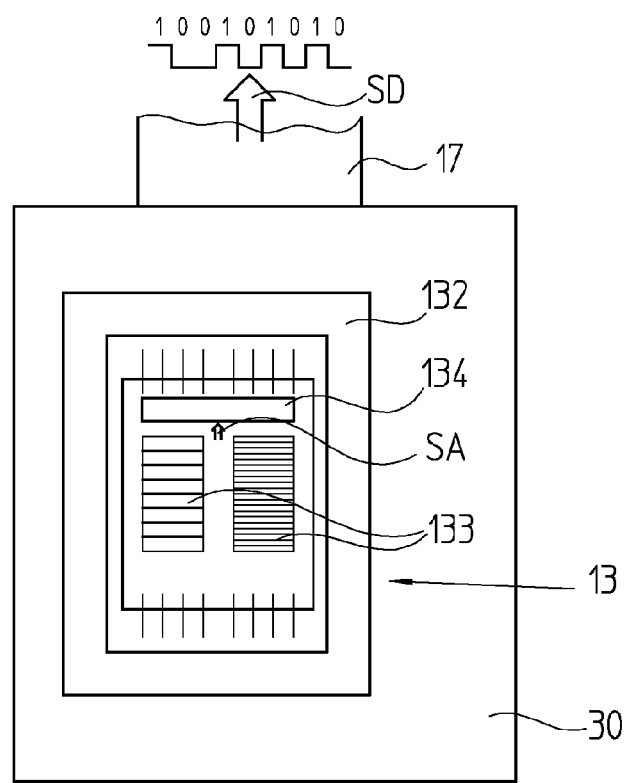
FIG. 3 shows a top view on an embodiment of a sensor chip of the scanning unit of FIG. 2 in accordance with the present invention.

As shown in FIGS. 1-3, an example of the present invention is shown. In particular, an optical length measuring device is shown, which measures the relative position of two objects 1 and 2, displaceable relative to one another in the measuring direction X. A transparent scale 20 is scanned by a scanning unit 10 that is movable relative to the scale 20 in the measuring direction X. The scale 20 has a measurement graduation, not shown, which is scanned by the scanning unit 10 using transmitted light. To that end, the scanning unit 10 has a lighting unit 11, which emits a beam of light that passes, collimated, through the scale 20 and onward through a transparent scanning plate 12 and finally strikes light-sensitive scanning sensors 133 (see FIG. 3) of a sensor chip 13. The beam of light is modulated as a function of position by the measurement graduation on the scale 20.

The scale 20 is disposed inside a housing 22, which in turn is secured to the object 2 to be measured, such as a machine bed of a machine tool. The scale 20 is connected to the housing 22 in a known manner, for instance by gluing or clamping. The housing 22 has a slot extending in the measuring direction X, which is along the longitudinal direction of the housing 22. The slot is closed by sealing lips inclined in gable-like fashion, through which a mounting block 14 reaches with a swordlike middle piece. The mounting block 14 has a mounting region 141, with which it can be secured to the object 1, such as a carriage of the machine tool, that is displaceable relative to the machine bed 2.

For exact parallel guidance along the scale 20, the scanning unit 10 is guided on guide faces of the scale 20 and/or of the housing 22. In the exemplary embodiment shown, the scanning unit 10 is guided via rollers 15 (see FIG. 2) on two guide surfaces of the scale 20 that are oriented perpendicular to one another. In addition, springs serve to generate a contact pressure on the guide surfaces of the scale 20.

Between the scanning unit 10 and the mounting block 14, there is a coupling, which couples the scanning unit 10 to the mounting block 14 rigidly in the measuring direction X and resiliently transversely thereto. As a result of this provision, misorientations of the mounting block 14 are not transmitted to the scanning unit 10. The coupling is embodied in a manner known per se, for instance as a spring wire that is rigid in the measuring direction, or as a ball coupling.

As shown in FIG. 3, the sensor chip 13 has an array of light-sensitive scanning sensors 133, which receive the light of the lighting unit 11. The light received by the sensors 133 is modulated as a function of position by the measurement graduation so that sensors 133 generate position-dependent electrical scanning signals SA. The sensor chip 13 is an electrical component, which in addition to the light-sensitive scanning sensors 133 includes an integrated circuit 134 which further processes the scanning signals SA. Such sensor chips 13 are also called ASICs or opto-ASICs. The integrated circuit 134 for instance has A/D converters, amplifiers, microprocessors, and also interface units, which prepare and convert the scanning signals SA into output signals SD that are present at an output line 17 and are carried to the outside. If the measurement graduation is an absolute code, the sensor chip 13 processes the scanning signals SA into an absolute multi-digit digital code word SD, which is furnished bit-serially via a serial interface unit at the output 17 of the sensor chip 13. For electrical connection of the length measuring device to a downstream electronic unit, the mounting block 14 has a connection capability. The output signals SD of the sensor chip 13 are carried via the output 17 to this connection capability, such as a plug connection.

Having the signal processing of the scanning signals SA into a multi-digit code word SD defining the position performed by the integrated circuit 134 of sensor chip 13 ensures the largely malfunction-free generation of measured values and enables malfunction-resistant serial transmission of digital measured position values SD originating at the sensor chip 13. A disadvantage of such integrated signal processing in the least amount of space is the relatively high energy requirement and thus the heat loss generated.

According to the present invention, the heat generated in the sensor chip 13 is conducted in a purposeful way to the housing 22 via a thermal conduction path. The housing 22 thus forms a heat sink. To that end, the sensor chip 13 is connected to a thermally conductive element 19, which is guided in the direction of the housing 22 and faces an inner wall 220 of the housing 22 with a slight gap L. Both the thermally conductive element 19 and the bonding of the thermally conductive element 19 to the sensor chip 13 are designed such that good heat transfer and good heat conduction are ensured in order to transfer the heat generated at the sensor chip 13 to the housing 22.

The gap L is in particular an air gap. In a manner not shown, however, the gap L can also be filled with some other medium, such as a fluid. This fluid can be retained in the gap by forces of adhesion, or, if the fluid is a magnetic fluid (Ferrofluid), by magnetic force.

Note that the sensor chip 13 may be a packaged sensor chip as shown in FIG. 3 that has a ceramic housing 132, whose covering is transparent and functions in a known manner as a scanning plate 12. The sensor chip 13 is disposed on a circuit board 30 and electrically contacted thereon. The sensor chip 13 is electrically contacted on one side of the circuit board 30. In order to enable good thermally conductive contact of a second portion 192 of the thermally conductive element 19 on the other side of the circuit board 30, a first portion 191 of the thermally conductive element 19 is provided in the form of a through hole plating of the circuit board 30. This through hole plating 191 can be a highly thermally conductive material placed in a bore of the circuit board 30, or a boltlike element, or it may include a plurality of through hole platings.

The first portion 191 forms a highly thermally conductive connection of the underside of the sensor chip 13 to the second portion 192. This second portion 192 is embodied in electrically insulating fashion, in order not to conduct any electrical interference from the thermally conductive element 19 to the sensor chip 13. To that end, this second portion 192 preferably is composed of a ceramic.

In turn, a third portion 193 of the thermally conductive element 19 is disposed on the second portion 192. The third portion 193 includes first and second regions 193.1 and 193.2 so that the third portion 193 extends onward in the direction of the housing 22. This third portion 193 is guided over the shortest possible distance in the direction of the housing 22 and is embodied such that with as large an area as possible, it faces the inner wall 220 of the housing with a slight air gap L. The air gap L is dimensioned such that the relative motion of the scanning unit 10 relative to the housing 22 is not hindered and good heat transfer to the housing 22 is ensured. The air gap L is approximately 0.1 mm to 1 mm, and in particular up to 0.5 mm.

The third portion 193 of the thermally conductive element 19 is preferably a highly thermally conductive sheet-metal part, such as a heat-conducting sheet metal, which has a first region 193.1 and a second region 193.2. The first region 193.1, extends transversely to the inner wall 220 of the housing 22 and the second region 193.2 extends parallel to the inner wall 220 and thus faces the inner wall 220 with as large an area as possible. This second region 193.2 preferably has an area of at least 200 mm² that faces the housing 22 with a slight spacing. For the heat-conducting sheet metal 193, a material should be selected that on the one hand is weighs as little as possible, since the scanning unit 10 should have a low weight, and on the other has good thermal conductivity. Aluminum, for example, is therefore especially well suited as material for the heat-conducting sheet metal 193.

In the concrete exemplary embodiment, the thermally conductive element 19 thus includes a first portion 191, formed by through hole platings, a second portion 192, formed by an intermediate piece of electrically insulating material, especially a ceramic, and a third portion 193, formed by a heat-conducting sheet metal. The materials of these portions 191, 192, 193, and the connections of these portions 191, 192, 193 to one another, are selected such that good thermal conduction in the direction of the housing 22 is ensured.

The lighting unit 11, the scanning plate 12, the sensor chip 13, the mounting block 14, the rollers 15, and the thermally conductive element 19 are secured to a base body 16 of the scanning unit 10 and are displaceable with this base body in the measuring direction X relative to the scale 20 and thus relative to the housing 22 as well. The base body 16 is of a material having a low coefficient of expansion as well as low thermal conductivity, in particular plastic. The thermal conductivity of the base body 16 is considerably lower than the thermal conductivity of the thermally conductive element 19.

The highly thermally conductive coupling of the thermally conductive element 19 to the sensor chip 13 is alternatively done by direct attachment of the third portion 193 of the thermally conductive element 19 to the sensor chip 13, for instance by soldering it on over as large an area as possible. This highly thermally conductive coupling can be done directly on one face, in particular the underside of an unpackaged sensor chip, or on the underside of the housing 132 of the packaged sensor chip 13. The underside is the face directly facing the heat-generating chip region. A highly thermally conductive coupling between the sensor chip 13 and the thermally conductive element 19 is attained if the coupling area is greater than 5 mm², in order to keep the heat transfer resistance as low as possible.

The heat generated by the sensor chip 13 is conducted purposefully to the solid housing 22 by the thermally conductive element 19. The housing 22 is especially well suited to heat dissipation, since it is embodied in an especially stable way for attachment to the object 2 to be measured and as a rule is made of metal, such as aluminum, that is, a highly heat-conductive material.

In a manner not shown, it may be advantageous if the thermally conductive element 19 facing the interior of the housing 22 is embodied as at least partly heat-insulating. For instance, the thermally conductive element 19 can be provided with a heat-insulating coating, for which the material known under the trademark of Neopren is for instance suitable. This coating can also be a lining. Naturally, this heat insulation is not provided on the surface region of the thermally conductive element 19 facing the inner wall 220 of the housing 22. As a result of this provision, it is attained that the heat absorbed by the sensor chip 13 is carried purposefully outside the housing 22, and the interior of the housing 22 is not heated up excessively. A thermal conduction path thermally insulated from the environment from the sensor chip 13 to the housing 22 is purposefully created.

In the measuring mode, when the housing 22 is mounted on the object 2 to be measured the housing 22 has thermally conductive contact with the object 2 to be measured so that heat can be output to that object as well. In a manner not shown, the heat dissipation can be still further reinforced by providing a cooling structure on the housing 22, specifically in the vicinity of the air gap L and/or between the housing 22 and the object 2 to be measured. This cooling structure may be cooling fins, or a channel with coolant flowing through it.

The present invention can also be employed in a length measuring device in which the scale is embodied in reflective fashion, and the sensor chip is located on the same side as the lighting unit. The scale can also be embodied such that it can be scanned magnetically, capacitively or inductively, wherein the sensor chip contains suitably modified sensor elements for generating position-dependent scanning signals. In a manner not shown, the sensor chip may also be embodied in multiple parts, in which all or only one of these components are heated in accordance with the present invention, which is why the present invention relates in general to the purposeful heat dissipation from a heat-generating electrical component of the scanning unit.

Advantageously, the electrical component is a sensor chip 13 that has scanning sensors 133 for scanning an absolute code on the scale 20 and for generating scanning signals SA. The sensor chip 13 also has an integrated circuit 134 for processing such scanning signals SA into a measured position value SD. The measured position value SD is furnished bit-serially by the sensor chip 13 as an output signal in the form of a multi-digit digital code word.

Further embodiment variations of the method and devices in accordance with the present invention of course exist besides the explained examples and embodiments.

We claim:

1. A length measuring device for measuring a relative position of two objects, the length measuring device comprising:
    a scale in a housing;
    a scanning unit displaceable in a measuring direction X relative to said scale and said housing, wherein said scanning unit is disposed inside said housing and comprising a heat-generating electrical component; and
    a thermal conduction path designed for transferring heat generated at said heat-generating electrical component to said housing.

2. The length measuring device as defined by claim 1, wherein said thermal conduction path is formed by a thermally conductive element; and
    wherein said thermally conductive element is coupled highly thermally conductively to said heat-generating electrical component and said thermally conductive element extends onward to said housing, in such a way that said thermally conductive element faces said housing with a slight gap so that heat generated at said heat-generating electrical component is transferred via said thermally conductive element to said slight gap and via said slight gap to said housing.

3. The length measuring device as defined by claim 2, wherein a two-dimensional region of said thermally conductive element is disposed facing an inner wall of said housing with said slight gap.

4. The length measuring device as defined by claim 3, wherein said two-dimensional region has an area of at least 200 mm², with a slight gap of less than 1 mm.

5. The length measuring device as defined by claim 4, wherein said two-dimensional region is a heat-conducting sheet metal.

6. The length measuring device as defined by claim 3, wherein said two-dimensional region is a heat-conducting sheet metal.

7. The length measuring device as defined by claim 2, wherein a portion of said thermally conductive element comprises an electrically insulating material.

8. The length measuring device as defined by claim 2, wherein said heat-generating electrical component is disposed on a circuit board; and
said thermally conductive element comprises:
- a first portion that leads from said heat-generating electrical component through said circuit board; and
- a second portion that leads to said slight gap.

9. The length measuring device as defined by claim 8, wherein said first portion comprises a through hole plating.

10. The length measuring device as defined by claim 1, wherein said heat-generating electrical component is a sensor chip comprising:
- scanning sensors for scanning said scale and generating scanning signals; and
- an electrical circuit that processes said scanning signals into a measured position value.

11. The length measuring device as defined by claim 10, wherein said measured position value is furnished bit-serially by said sensor chip as an output signal in a form of a multi-digit digital code word.

\* \* \* \* \*